United States Patent

Cohn

[15] 3,706,941

[45] Dec. 19, 1972

[54] RANDOM NUMBER GENERATOR

[72] Inventor: Charles E. Cohn, Clarendon Hills, Ill.

[73] Assignee: The United States of America as represented by the United States Atomic Energy Commission

[22] Filed: Oct. 28, 1970

[21] Appl. No.: 84,674

[52] U.S. Cl. ....................................... 331/78, 328/59

[51] Int. Cl. .............................................. H03b 29/00

[58] Field of Search ............................331/78; 328/59

[56] References Cited

UNITED STATES PATENTS

| | | | |
|---|---|---|---|
| 3,208,008 | 9/1965 | Hills | 331/78 |
| 3,366,779 | 1/1968 | Catherall et al. | 331/78 |
| 3,456,208 | 7/1969 | Ratz | 331/78 |

OTHER PUBLICATIONS

Electronics, "Generating Random Noise" J.B. Manelis g. 66–69, Sept. 8, 1961

*Primary Examiner*—John Kominski
*Attorney*—Roland A. Anderson

[57] ABSTRACT

A physical noise source is used to develop a first sequence of random bits. A second sequence of random bits is formed from the first sequence by comparing the bits in each pair of bits of the first sequence. Every other bit of the second sequence is complemented to form a sequence of random numbers. The random numbers can be combined to form words.

3 Claims, 2 Drawing Figures

Inventor
Charles E. Cohn

Attorney

Inventor
Charles E. Cohn

Attorney

RANDOM NUMBER GENERATOR

CONTRACTUAL ORIGIN OF THE INVENTION

The invention described herein was made in the course of, or under, a contract with the United States Atomic Energy Commission.

BACKGROUND OF THE INVENTION

This invention relates to an improved random number generator using a physical noise source. Conventional multiplicative-congruential algorithms for random number generation do not have ideal statistical properties. It is therefore desirable to use the classical method of generating random numbers from physical sources of random noise.

Random numbers can be formed by the accumulation of random bits in a shift register. Each random bit is derived from a random noise voltage. A random number is thus obtained with a single input operation — much faster than with an algorithmic generator. However, this simple scheme develops random numbers having nonideal statistical properties because the circuits used are not ideal. Unavoidable unbalance in the sampler circuits will introduce a bias in the random bits. In addition, correlations between neighboring bits could result from a limited noise bandwidth as well as sampler hysteresis. There exist methods which are used to eliminate the bias of random bits. However, in these older methods the choice between one or the other value for a given bit is influenced by an average of values of bits previously produced. The introduction of said average leads to undesired long-term correlations.

It is therefore an object of this invention to provide an improved random number generator.

Another object of this invention is to provide a random number generator using a physical noise source to generate random numbers.

Another object of this invention is to provide a method of correcting random numbers derived from a physical noise source for statistical imperfections arising from the electronic circuits used.

Another object of this invention is to provide a method for correcting random bits derived from a physical noise source without reference to bits previously generated.

SUMMARY OF THE INVENTION

In practicing this invention, a method is provided in which a first sequence of random bits is derived from a physical noise source. The bits in consecutive pairs of bits of the first sequence are compared to develop a second sequence of random bits. The first bit of the pair is complemented if the second bit in the pair of first sequence bits is a first value. The first bit of the pair is unchanged if the second bit in the pair of first sequence bits is a second value. The bits in the second sequence are formed by the first bits of the pairs modified as described. The sequence of random numbers can then be developed from the second sequence of random bits by complementing every other bit in the second sequence. Random words can be developed from the random bit sequence.

DESCRIPTION OF THE DRAWINGS

The invention is illustrated in the drawings, of which.

DESCRIPTION OF THE INVENTION

Figure 1:
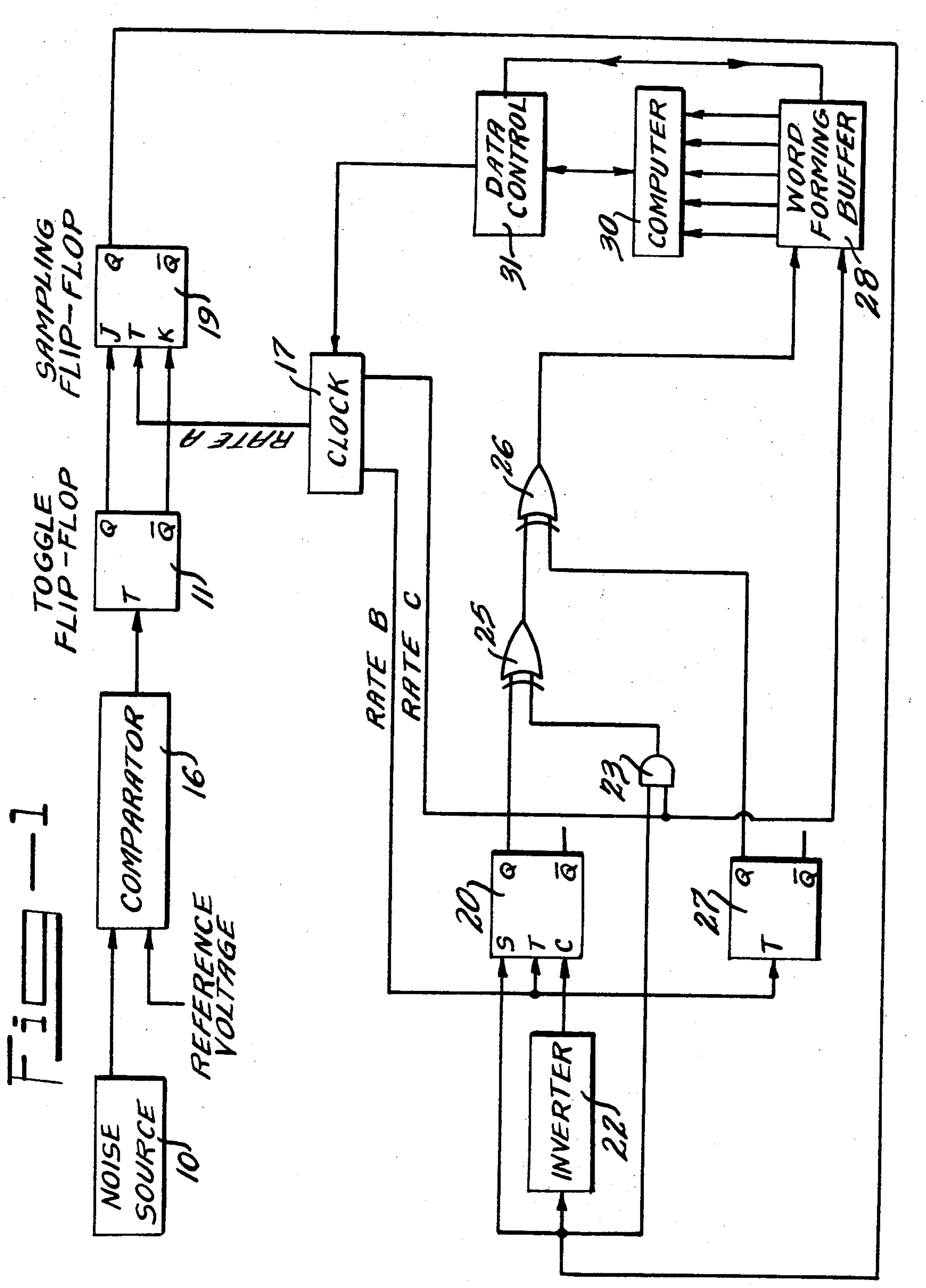
FIG. 1 is a partial block diagram and partial schematic of the random number generator.

A first sequence of random bits is derived from a physical noise source. Referring to FIG. 1, a noise source 10 develops a "white noise" output which is one input of comparator 16. The other input of comparator 16 is connected to a DC reference voltage which is approximately equal to the median level of the noise from noise source 10. The output of comparator 16 is then a square wave that makes a transition from space to mark whenever the noise from noise source 10 crosses the reference-voltage level in one direction and makes a transition from mark to space when the noise from noise source 10 crosses the reference-voltage level in the other direction.

The output of comparator 16 is applied to the toggle input of toggle flip-flop 11, which changes state from reset to set or from set to reset every time the input square wave changes from mark to space.

Bias can result from flip-flop 11 spending more time in one state than in the other. This arises from the properties of the flip-flop. For toggling to occur, the mark interval of the input square wave must be long enough to prime the flip-flop for a change of state. If the mark interval is too short, complementation will not occur on the mark-space transition. In any actual flip-flop, the components will not be exactly symmetrical so that the mark interval required to prime for a state change in one direction may be slightly longer than that required to prime for a state change in the other direction. The properties of the noise from noise generator 10 give rise to a distribution of mark intervals such that a certain fraction are long enough to initiate a state change in one direction but are not long enough to initiate a state change in the other direction. Thus, a bias will arise.

The set and reset outputs of toggle flip-flop 11 go to the steering inputs of sampling flip-flop 19. When a clock pulse is applied to the clock input of sampling flip-flop 19, the state of toggle flip-flop 11 at that time is sampled and held by the sampling flip-flop 19. Since the clock pulses are independent of the state changes of toggle flip-flop 11, there will be a certain number of instances where the time interval between the most recent state change and the clock pulse is insufficient to prime the sampling flip-flop 19 for a state change, so that the sampling flip-flop 19 will remain in its previous state. This hysteresis gives rise to correlations between successive random bits.

Figure 2:
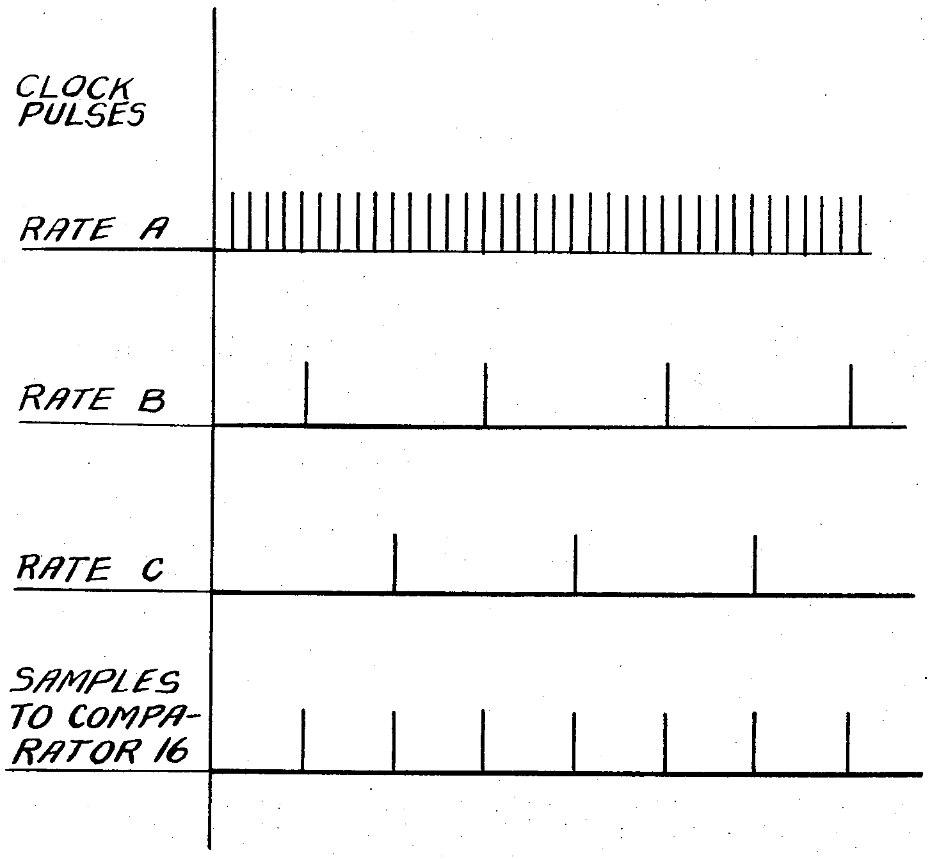
FIG. 2 shows the timing of the clock pulses.

To minimize correlations due to a limited noise bandwidth, the effective sampling rate should be much less than the clock rate of the computer using the random number. The sampling rate should be just sufficient to generate one random number during the minimum time interval between computer requests for random numbers. To minimize correlations due to sampler hysteresis, the sampler should take samples as frequently as possible. The samples taken would be accepted only at the desired rate with in-between samples discarded. Thus the clock rate A from clock 17 applied to sampling flip-flop 19 would be many times the clock rates B and C. Clock rates B and C are the same but with the pulses alternating (see FIG. 2). The sequence of bits developed by sampling flip-flop 19 is coupled to the set input of J-K flip-flop 20, inverter 22 and AND gate 23.

The first bit of each pair of bits in this sequence is used to determine if the second bit of the pair is to be complemented. Complementing a binary number means that the binary digit 0 is changed to a 1, and the binary digit 1 is changed to a 0. The first bit received is applied to J-K flip-flop 20 at the same time an activating pulse is applied to the flip-flop 20. If the bit is a 0, it is inverted in inverter 22 and clears J-K flip-flop 20 so that the output of flip-flop 20 is 0. If the bit is a 1, it sets J-K flip-flop 20 so that the output of flip-flop 20 is 1. The second bit received does not act on flip-flop 20 as there is no activating pulse for the second bit. Thus flip-flop 20 acts to store every other bit.

The second bit is received by AND gate 23 at the same time as an enabling pulse is applied thereto. Thus the second bit is coupled to an EXCLUSIVE OR gate 25 where it is compared with the first bit. If the first bit is a 1, the output of the EXCLUSIVE OR gate 25 is the complement of the second bit. If the first bit is a 0, the output of the EXCLUSIVE OR gate 25 is the same as the second bit.

Let $\delta$ be the bias of the series of random bits from the output of sampling flip-flop 19, and let $\epsilon$ be the correlation from one bit to the next. That is, the probability that any bit will be one is $0.5 + \delta$, the probability that the bit following a one will also be a one is $0.5 + \delta + \epsilon$, and the probability that the bit following a zero will be a one is $0.5 + \delta - \epsilon$. Then the probability that any bit from the output of EXCLUSIVE OR gate 25 will be a one is $0.5 - 2\delta^2 - \epsilon$. If $\epsilon$ is sufficiently small, a substantial improvement in bias may be obtained.

Every other bit of this new sequence of random bits is now complemented. The output of EXCLUSIVE OR gate 25 is applied to EXCLUSIVE OR gate 26. The second input to EXCLUSIVE OR gate 26 is an alternating sequence of 0's and 1's from J-K flip-flop 27. Flip-flop 27 is set for toggle operation in response to the C pulses from clock 17. If the output of flip-flop 27 is a 1, the bit from EXCLUSIVE OR gate 25 is complemented by EXCLUSIVE OR gate 26. If the output of flip-flop 27 is a 0, EXCLUSIVE OR gate 26 does not change the bit received from EXCLUSIVE OR gate 26. Thus EXCLUSIVE OR gate 26 acts to complement every other bit. The bias of the series of random bits from the output of EXCLUSIVE OR gate 26 is identically zero. The correlation from one bit to the next depends on the bias of the series of random bits from the output of EXCLUSIVE OR gate 25. With practical generators, this bias can be made so low that the correlation is not significant in any practical situation.

The output bits from EXCLUSIVE OR gate 26 are applied to a word-forming buffer 28 which can be a shift register. Bits are received by buffer 28 serially and are transferred to computer 30 in parallel as random numbers or words. Data control provides control signals for the random number generator.

Where the bias in the sequence of random bits derived from the physical noise source is sufficiently low, the step of comparing the bits of each pair of bits can be eliminated. The output of sampling flip-flop 19 is coupled directly to EXCLUSIVE OR gate 26 where every other bit is complemented as previously described.

The embodiments of the invention in which an exclusive property or privilege is claimed are defined as follows:

1. The method of producing a final random sequence of bits including the steps of:
   a. developing a first random sequence of bits from a physical noise source, and
   b. developing the final random sequence of bits by complementing every other bit of said first random sequence of bits with the bits intermediate said every other bits being unchanged.

2. A method of producing a final random sequence of bits including the steps of:
   a. developing a first random sequence of bits from a physical noise source;
   b. comparing the binary value of the first bit of consecutive pairs of bits of the first random sequence of bits with the binary value of the second bit of the same pair of bits and developing a third bit having the binary value of the second bit when said first bit has one binary value and using the complement of said second bit as said third bit when said first bit has the other binary value;
   c. forming a second random sequence of bits from said third bits with the sequence of said third bits in said second random sequence of bits being the same as the sequence of said consecutive pairs of bits from which said third bits are formed; and
   d. developing said final random sequence of bits by complementing every other bit of said second random sequence of bits with the bits intermediate said every other bits being unchanged.

3. The method of producing the final sequence of random bits of claim 2 further including the step of:
   a. combining a desired number of bits of said final random sequence of bits to form a random number with the sequence of bits forming said random number being the same as their sequence in said final random sequence.

* * * * *